Patented Feb. 28, 1950

2,499,257

UNITED STATES PATENT OFFICE 2,499,257

2 - METHYL - 7 - HYDROXY - TETRAHYDRO-PHENANTHRENE - CARBOXYLIC ACID DERIVATIVES AND THE PRODUCTION THEREOF

George M. Picha, Chicago, Ill., and Robert P. Jacobsen, Shrewsbury, and Gregory Pincus, Worcester, Mass., assignors to G. D. Searle & Co., Skokie, Ill., a corporation of Illinois No Drawing. Application December 17, 1947, Serial No. 792,324

19 Claims. (Cl. 260—344.6)

This invention relates to dihydroxytetrahydrophenanthrenealkanecarboxylic acid derivatives, and to the preparation thereof. In particular it relates to tetrahydrophenanthrene compounds having the general structural formula

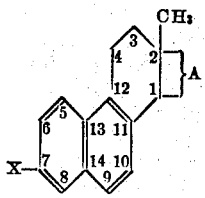

wherein A, attached to carbon atoms 1 and 2, represents a lactone grouping having the empirical formula $C_3H_4O_2$ or alcoholic and aliphatic carboxylic acid groups having an aggregate empirical formula $C_3H_6O_3$, which by lactonization can form a lactone grouping, and wherein X represents a monovalent oxygen function such as hydroxyl and related groups, including acyloxy, alkoxy and aralkoxy groups. This invention relates also to salts and esters of the foregoing carboxylic acids.

The compounds to which this invention relates are obtained by oxidizing equilenin, or an ester or ether thereof, with an organic peracid, or hydrogen peroxide, in an inert solvent. Equilenin has the structural formula

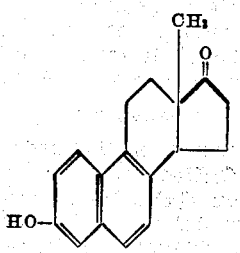

By oxidation of equilenin or its esters with a peroxide or a peracid there is cleavage of the cyclopentanone ring with the resultant formation of a lactone grouping. The lactone ring may be opened, forming an alcoholic hydroxyl radical and an alkanecarboxylic acid group. These groups can be relactonized by treatment with acid or by warming.

From the foregoing it follows that the 2-methyl - 7 - hydroxy - 1,2,3,4 - tetrahydrophenanthrene nucleus which is formed in the compounds of this invention is the same as that present in equilenin, the parent substance.

The oxidation is preferably conducted in the presence of an acidic catalyst, although such catalyst is not required. Suitable as catalysts are strong organic and inorganic acids which are not susceptible to oxidation or reduction. Among these are sulfuric, phosphoric, benzenesulfonic, toluenesulfonic, alkanesulfonic and alkylated sulfuric acids, including methyl sulfuric acid, ethyl sulfuric acid, and the like. A neutral or acidic medium has been found to be satisfactory for the process. The preferred medium is a lower alkanoic acid such as acetic or propionic acid. Suitable also are stable neutral solvents such as lower tertiary alcohols, ethers, hydrocarbons and halogenated hydrocarbons, as for example, t-butyl alcohol, chloroform and carbon tetrachloride. Mixtures of water and water-miscible inert organic solvents are also satisfactory. The processes can be carried out over a fairly wide range of temperature, varying from about 5° C. to as high as 70° C. The oxidizing agent is preferably peracetic acid in glacial acetic acid. However hydrogen peroxide in aqueous acetic acid is nearly as efficient. Suitable also are other organic peracids such as lower aliphatic peracids, perbenzoic acid, and the like. The oxidizing agents which are suitable for our processes are peroxides and have in common the —O—O— configuration.

The 3-hydroxyl radical of equilenin is preferably protected during the oxidation, although this is not essential. For this purpose we prefer to use the acetyl group, as equilenin acetate is one of the more readily available derivatives. Other acyl, alkyl and aralkyl radicals are equally suitable, among them being the propionyl, benzoyl, methyl, ethyl, propyl, benzyl, naphthylmethyl and related groups. The acyl and arylmethyl radicals are readily cleaved after oxidation by hydrolysis or hydrogenolysis, affording the free hydroxyl radical if desired.

Salts of the carboxylic acids to which this invention relates are most conveniently produced by treatment of the corresponding lactone with an alkali, generally with warming. The lactone ring is thereby opened and the salt is simultaneously formed. Concentration of the solution causes precipitation of the desired salt. Similarly the salt may be prepared in alcoholic alkali and precipitated by the addition of a solvent in which the salt is insoluble, as for instance, ether or benzene.

The carboxyl group of the acids obtained by the opening of the lactone ring may be converted to esters by suitable methods. Warming causes relactonization, which is a special type of esterification, viz., inner-ester formation. Treatment with diazomethane and other diazo hydrocarbons such as phenyldiazomethane results in the formation of the methyl and benzyl and related esters.

The pituitary gland, as the so-called master gland of the body, elaborates and secretes certain hormones which control and stimulate the secretions of certain other glands, including the adrenals, testes and the ovaries. The secondary glands in turn are the source of secretion of various steroid hormones. The ovarian steroid hormones, in addition to controlling phases of the menstrual cycle and organs of the female reproductive system, also act to inhibit certain phases of the activity of the pituitary gland, forming in this way a self-regulating system of physiological balance. At the time of the menopause, secretions of estrogens by the ovaries ceases or declines markedly. As a result, secretions of gonadotrophin (the hormone or hormones which stimulate the activity of the gonads to secrete estrogenic hormones) and other hormones by the pituitary often reach excessive levels, since they are no longer restrained by the presence of estrogenic hormones. This tends to cause many of the unpleasant and undesirable symptoms frequently associated with the menopause. The administration of estrogenic hormone substances is known to control such symptoms, at least in part through their pituitary inhibition, but it produces undesirable estrogenic effects at the same time. Thus it will be seen that a substance which will effectively inhibit certain pituitary activity and at the same time not produce estrogenic activity is a useful, valuable and desirable addition to the field of therapeutics. It is the object of this invention to provide such substances.

The polyhydrophenanthrene lactones and derivatives thereof which comprise this invention are new and useful compositions in the field of therapeutics by virtue of their ability to affect the secretion of hormones by the pituitary gland. More particularly, the new compositions of this invention are uniquely useful and valuable in medicine for the control of certain glandular disorders, because they possess little or no estrogenic activity.

The tetrahydrophenanthrene lactones and derivatives thereof may be prepared as specifically disclosed in the following examples. These examples are illustrative in nature and are not intended to limit our invention in any way. The relative amounts of materials are given in parts by weight unless otherwise noted.

*Example 1*

One part of equilenin acetate, which has the structural formula

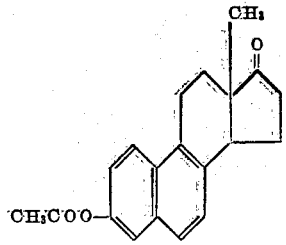

is dissolved in about 5 parts of glacial acetic acid, and about 17 parts of a solution of peracetic acid in glacial acetic acid are added (this solution contains approximately 0.0012 mole of peracetic acid in each cubic centimeter). The mixture is maintained at about 10° centigrade for from 90 to 100 hours. At the end of this time the crude product is precipitated by the addition of a large excess of water, and it is purified by one or more recrystallizations from methanol or other suitable solvents. By this procedure the acetoxy lactone of composition $C_{20}H_{20}O_4$ is obtained in a yield of about 50% of the theoretical. The acetoxy lactone, when pure and anhydrous, melts at 156.0–156.3° C. This compound is believed to have the structural formula

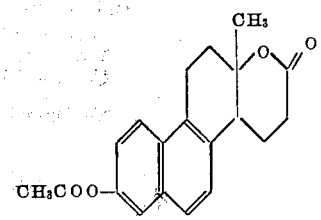

It will be obvious to one skilled in the art that the preparation can also be carried out using modified reaction conditions. For example, satisfactory results have also been obtained by carrying out the reaction at a temperature of 35° C. for a period of only about 24 hours. We prefer to carry out the reaction using a lower temperature and a longer reaction time.

Oxidizing agents other than peracetic acid can also be employed. For example, the lactone can also be prepared from equilenin acetate by using 30% aqueous hydrogen peroxide in a solution of acetic acid as the oxidant.

*Example 2*

A solution of 0.62 gram of equilenin acetate in 6 milliliters of acetic acid and 1.5 ml. of 30% aqueous hydrogen peroxide is kept at 25° C. for 60 hours. The reaction mixture is diluted with water, causing the precipitation of a yellow, partially crystalline solid in 30–40% yield. The melting point after recrystallization from aqueous methanol is 142–147° C. When 0.72 g. of this material is hydrolyzed with aqueous methanolic potassium hydroxide and the cold, methanol-free solution is saturated with carbon dioxide, there is precipitated 0.23 g. of equilenin. The filtrate is strongly acidified and warmed, causing the separation of 0.35 g. of sparingly soluble, brown solid. This after acetylation with acetic anhydride and pyridine, and recrystallization from aqueous methanol, forms fine, colorless needles of the acetoxy lactone of M. P. 155–157° C.

*Example 3*

The preparation of the hydroxy lactone of composition $C_{18}H_{18}O_3$ from the acetoxy lactone of composition $C_{20}H_{20}O_4$ is carried out by an alkaline saponification of the latter compound, followed by acidification of the reaction mixture and heating to effect relactonization.

In a typical preparation, 1 part of the acetoxy lactone is suspended in about 70 parts of a 2% solution of sodium hydroxide in water. This mixture is heated at about 100° C. for approximately two hours. At the end of this time the acetoxy lactone is completely in solution (as the disodium salt of the dihydroxy acid which results from the saponification of the acetoxy group and the opening of the lactone ring). The mixture is diluted with about 200 parts of water, heated again almost to boiling, and treated with excess hydrochloric acid. About 95% of the theoretical amount of the hydroxy lactone is precipitated as a pink, crystalline solid which is removed by filtration. It is purified by one or more recrystallizations from 2-methoxyethanol, giving a white, crystalline product whose melting point (defined as the temperature required for complete fusion in an aluminum block in one minute) is 292° C. This compound is believed to have the structural formula

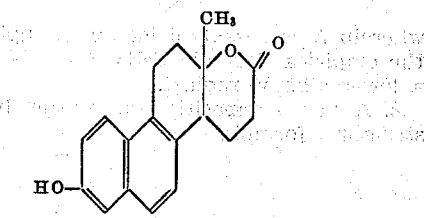

*Example 4*

The preparation of the methoxy lactone of composition $C_{19}H_{20}O_3$ is carried out by treating an alkaline saponification mixture of the acetoxy lactone of Example 1 with dimethyl sulfate, or by treating an alkaline solution of the hydroxy lactone with dimethyl sulfate, or by refluxing the hydroxy lactone with methyl iodide in the presence of silver oxide, followed by saponification of the methylation product (to convert any ester which may be formed to the salt of the free acid), acidification, and relactonization.

In a typical preparation, 1 part of acetoxy lactone is saponified by heating it at 100° C. for 2 hours with about 70 parts of 1% sodium hydroxide solution. The clear solution which results is shaken at 50–60° C. with about 3 parts of dimethyl sulfate, added in small portions, alternately with sufficient sodium hydroxide solution to keep the mixture alkaline. The mixture is then acidified (to Congo Red) with hydrochloric acid, and the solid product is removed by filtration. It is resaponified with aqueous sodium hydroxide as disclosed in Example 2, and this mixture is treated while hot with excess hydrochloric acid. The crude methyl ether of the lactone precipitates and is removed by filtration and purified by recrystallization from methanol, giving a yield of about 80% of the theoretical amount. The melting point of this compound is 197.3–199.5° C. The methoxy lactone is believed to have the structural formula

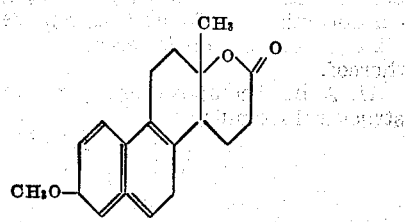

*Example 5*

The dihydroxy acid of composition $C_{18}H_{20}O_4$ is prepared by cautiously acidifying an alkaline saponification mixture of the acetoxy lactone or hydroxy lactone.

In a typical preparation, 1 part of the acetoxy lactone is suspended in about 70 parts of a 2% solution of sodium hydroxide in water. This mixture is heated at about 100° C. for approximately 2 hours. At the end of this time the acetoxy lactone is completely in solution (as the disodium salt of the dihydroxy acid which results from the saponification of the acetoxy group and the opening of the lactone ring). The solution is chilled in an ice bath and acidified to pH 5 by the dropwise addition, with constant shaking, of cold, dilute hydrochloric acid. (The addition of excess hydrochloric acid, or warming the mixture, will cause relactonization.) The crude product is collected on a filter as a tar. It is precipitated from acetone solution by the addition of water, and the solid product obtained in this manner is washed well with water and purified by one or more recrystallizations from a mixture of ethyl acetate and benzene. The yield is about 55% of the theoretical amount, and most of the remainder of the product can be recovered from the aqueous liquors as the less-soluble hydroxy lactone. The dihydroxy acid is believed to have the formula

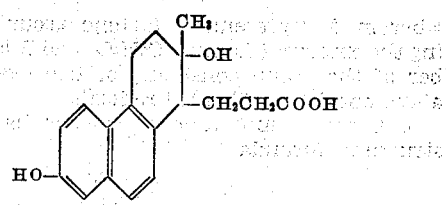

When the melting point of the dihydroxy acid is determined in the conventional manner, it is converted into the hydroxy lactone before fusion, and exhibits the melting point behavior characteristic of the latter compound. The melting point of the dihydroxy acid, when determined instantaneously in a pre-heated bath, is 135° C. It evolves water vapor during the process of fusion and immediately resolidifies as the hydroxy lactone.

*Example 6*

The methoxy lactone (Example 4) is saponified in 2% sodium hydroxide solution according to the general method of Example 3. The resulting solution of the sodium salt of the methoxy hydroxy acid is carefully neutralized in the cold with dilute acid as in Example 5. The methoxy hydroxy acid is extracted immediately with ether. The resulting ether solution is treated at room temperature with an ether solution of diazomethane, until an excess is present as shown by the persistence of the yellow color. The reaction mixture is allowed to stand overnight during which time the ether is allowed to evaporate. The methyl ester of the methoxy hydroxy acid is obtained as a semi-solid. This ester is believed to have the structural formula

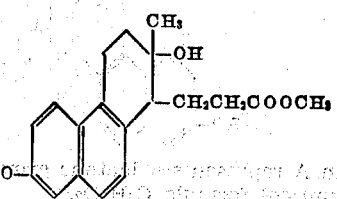

We claim:
1. A new composition of matter having the structural formula

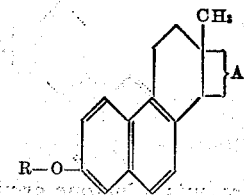

wherein A represents a member of the group consisting of a lactone grouping having the empirical formula $C_3H_4O_2$ and the corresponding hydroxy and aliphatic carboxylic acid substituents having an aggregate empirical formula $C_3H_6O_3$ derived from said lactone by hydrolysis, and wherein R is a member of the group consisting of hydrogen, lower alkyl, and lower alkanoyl radicals.

2. A new composition of matter having the structural formula

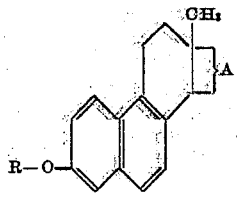

wherein A represents a lactone grouping having the empirical formula $C_3H_4O_2$ and R is a member of the group consisting of hydrogen, lower alkyl, and lower alkanoyl radicals.

3. A new composition of matter having the structural formula

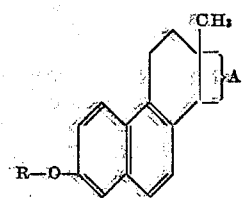

wherein A represents hydroxyl and aliphatic carboxylic acid groups having an aggregate empirical formula $C_3H_6O_3$ and R is a member of the group consisting of hydrogen, lower alkyl, and lower alkanoyl radicals, and alkali metal salts thereof.

4. A new composition of matter having the structural formula

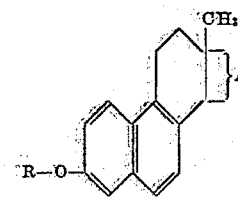

wherein A represents a lactone grouping having the empirical formula $C_3H_4O_2$ and R is a lower alkanoyl radical.

5. A new composition of matter having the structural formula

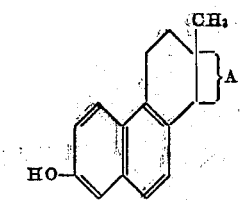

wherein A represents a lactone grouping having the empirical formula $C_3H_4O_2$.

6. A new composition of matter having the structural formula

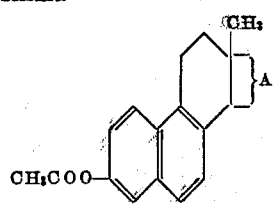

wherein A represents a lactone grouping having the empirical formula $C_3H_4O_2$.

7. A new composition of matter having the structural formula

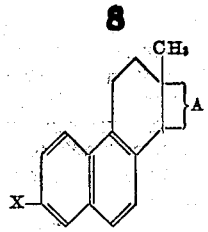

wherein A represents a lactone grouping having the empirical formula $C_3H_4O_2$ and X represents a lower alkoxyl radical.

8. A new composition of matter having the structural formula

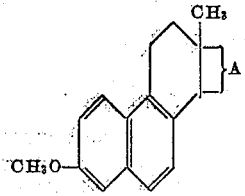

wherein A represents a lactone grouping having the empirical formula $C_3H_4O_2$.

9. A new composition of matter having the structural formula

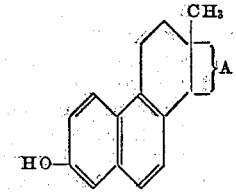

wherein A represents alcoholic and aliphatic carboxylic acid groups having an aggregate empirical formula $C_3H_6O_3$, and lower alkyl esters and salts thereof.

10. A new composition of matter having the structural formula

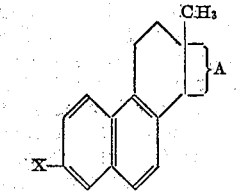

wherein A represents hydroxyl and aliphatic carboxylic acid groups having an aggregate empirical formula $C_3H_6O_3$ and X represents a lower alkoxyl radical, and lower alkyl esters and salts thereof.

11. A new composition of matter having the structural formula

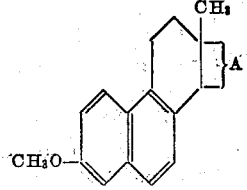

wherein A represents hydroxyl and aliphatic carboxylic acid groups having an aggregate empirical formula $C_3H_6O_3$ and salts thereof.

12. A new composition of matter having the structural formula

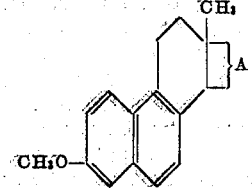

wherein A represents hydroxyl and aliphatic carbomethoxy groups having an aggregate empirical formula $C_4H_8O_3$.

13. The process of producing a compound having the formula

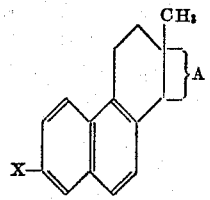

wherein A represents a lactone grouping having the empirical formula $C_3H_4O_2$ and X is a member of the group consisting of hydrogen, lower alkyl, and lower alkanoyl radicals, which comprises oxidizing an equilenin derivative having the formula

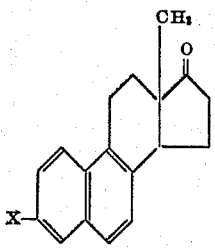

with an oxidizing agent of the group consisting of hydrogen peroxide and organic peracids, in an inert solvent.

14. The process according to claim 12 wherein the oxidizing agent is peracetic acid.

15. The process according to claim 12 wherein the oxidizing agent is aqueous hydrogen peroxide in acetic acid.

16. A hydroxy lactone as in claim 5 having an empirical formula $C_{18}H_{18}O_3$ and a melting point of 292° C. (metal block, one minute).

17. An acetoxy lactone as in claim 6 having the empirical formula $C_{20}H_{20}O_4$ and a melting point of 155–157.5° C.

18. A methoxy lactone as in claim 8 having the empirical formula $C_{19}H_{20}O_3$ and a melting point of 197.3–199.5° C.

19. A dihydroxy acid as in claim 9 having the empirical formula $C_{18}H_{20}O_4$ and a melting point of 135° C. when determined instantaneously in a pre-heated bath.

GEORGE M. PICHA.
ROBERT P. JACOBSEN.
GREGORY PINCUS.

REFERENCES CITED

The following references are of record in the file of this patent:

Doisy, Endocrinology, vol. 30, 1942, page 936.
Heer et al. Helvetica Chimica Acta, v. 28 (1945), pages 1506–1508.

Certificate of Correction

Patent No. 2,499,257                          February 28, 1950

GEORGE M. PICHA ET AL.

It is hereby certified that errors appear in the printed specification of the above numbered patent requiring correction as follows:

Column 4, line 53, for "155–157° C." read *155–157.5° C.*; column 6, line 1, before "The" insert an opening parenthesis; line 75, for "hydroxy" read *hydroxyl*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*